Oct. 26, 1943.  C. H. BJÖRKBOM  2,332,983
DEVICE FOR CHECKING THE PROFILE OF WORK PIECES
Filed Dec. 26, 1940  2 Sheets-Sheet 1

INVENTOR
Carl Hjalmar Björkbom
BY *Chas. Lyn Russell*
HIS ATTORNEY

Oct. 26, 1943.                C. H. BJÖRKBOM                    2,332,983
                 DEVICE FOR CHECKING THE PROFILE OF WORK PIECES
                      Filed Dec. 26, 1940          2 Sheets-Sheet 2

INVENTOR
Carl Hjalmar Björkbom

Patented Oct. 26, 1943

2,332,983

UNITED STATES PATENT OFFICE 2,332,983

DEVICE FOR CHECKING THE PROFILE OF WORKPIECES

Carl Hjalmar Björkbom, Goteborg, Sweden, assignor to Aktiebolaget Svenska Kullagerfabriken, Goteborg, Sweden, a corporation of Sweden Application December 26, 1940, Serial No. 371,654 In Sweden January 20, 1940

3 Claims. (Cl. 33—174)

The present invention relates to a device for checking the profile of work pieces, especially metallic objects. Templates have hitherto in some cases been used for this purpose. The template was placed along the portion of the object to be gauged. The object and the template were illuminated and the light penetrating therebetween was observed and considered as an indication of lacking conformity between the object and the template. To check the forms of an object according to this method is however exceedingly trying for the eyes of the operator, and furthermore the accuracy of the gauging operation will be dependent upon the carefulness and attention of the operator. This method is further only suitable for examining external surfaces. In some other cases the forms of the object are checked by using marking color applied to a marking roll or the like, which is subsequently rolled against the surface to be examined. Both the methods mentioned are however time wasting, and the result depends on the skill of the operator. The object of the invention is to obviate these inconveniences. The gauging device according to the invention is characterized substantially thereby that its gauging surface is divided into a number of segments, which are firmly connected to each other but electrically insulated from each other and coupled in electrical circuits, and that signal members such as electric lamps are arranged in the circuits for the purpose of indicating whether the corresponding segment is in contact with the work piece or not. With the aid of the gauging arrangement according to the invention an accuracy is attained which is fully equivalent to and in certain cases surpasses the accuracy afforded by methods hitherto known. The gauging arrangement according to the invention can be used for checking external as well as internal surfaces and profiles.

The drawings enclosed show an embodiment of the invention, in which

Figure 1:
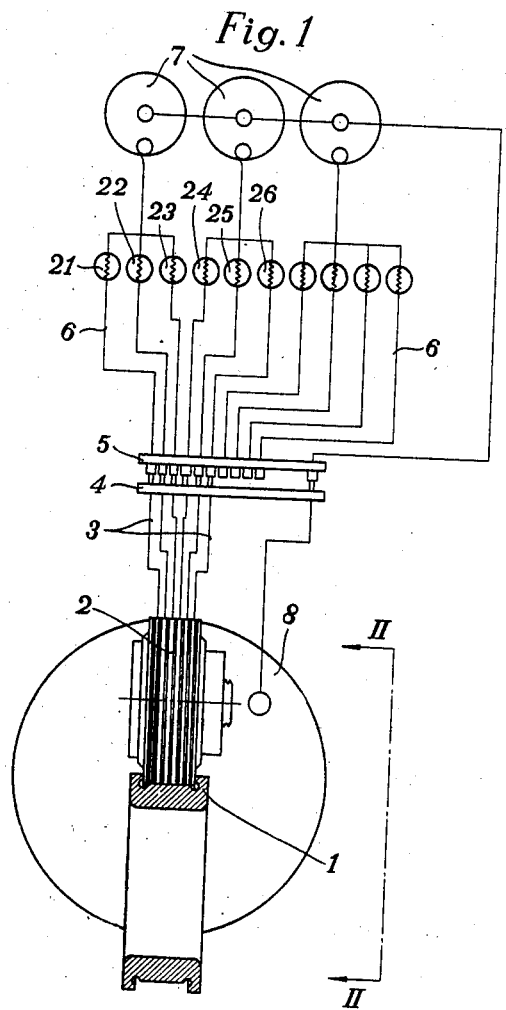
Figure 2:
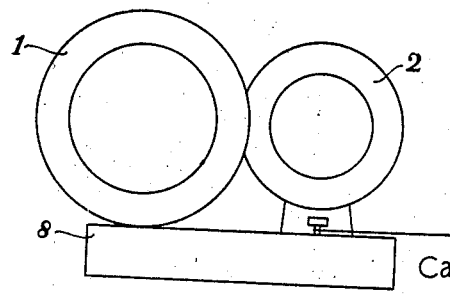
Figure 3:
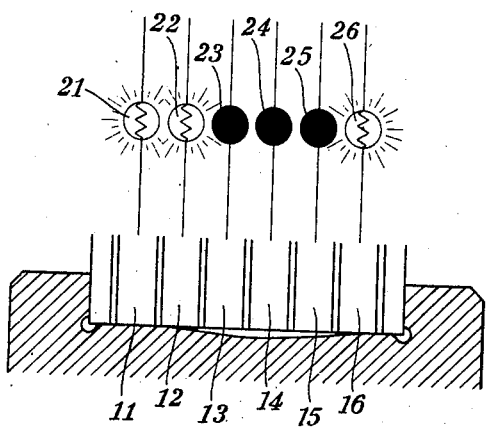
Figure 4:
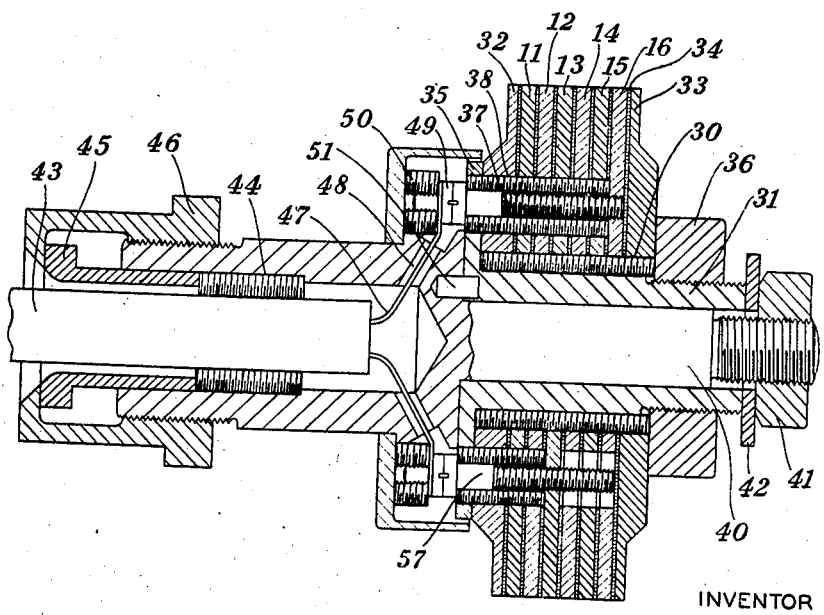

Fig. 1 is a schematical horizontal projection of the gauging arrangement and a work piece shown in section, Fig. 2 is a partial vertical projection of the arrangement according to Fig 1 seen in the direction of the arrows II—II in Fig. 1, Fig. 3 shows the contact points of the checking segments with the work piece on an enlarged scale and signal lamps coupled to the segments, and Fig. 4 shows a section through the controlling segments and their electric connections.

In the drawings the gauging arrangement is shown applied for checking the inner rings 1 of cylindrical roller bearings. The examination has the purpose to determine whether the generatrix of the race is rectilinear. Previously this checking has been performed by rolling a marking roll coated with marking color against the race and observing the coloring effect. This method is however, as already mentioned, time wasting as well as inexact. According to the invention a swift checking operation is obtained by using a number of work-contacting members, i. e., plates 11, 12, 13, 14, 15 and 16 (Figs. 3 and 4) of electrically conducting material which are separated from each other by insulating partitions and kept together in a parcel or gauging unit generally designated with 2 in Figs. 1 and 2. After their assembly as a unit the plates have been very exactly worked into cylindrical form. Each plate 11—16 is connected to the pin of a plug contact, schematically shown at 4 in Figure 1, by an electric conductor 3. The different contact pins are provided for engagement in corresponding contact sleeves of a contact socket 5 which over a plurality of parallel conductors 6 are connected to three batteries 7. In each conductor 6 is coupled a signal lamp 21, 22, 23, 24, 25, and 26. The batteries are in their turn connected to an electrically conducting support plate 8.

When a roller bearing ring is to be examined, it is placed on the support plate 8, as shown in Fig. 2, and rolled forward until it enters into contact with the gauging unit 2. The roller bearing ring hereby closes a number of circuits, each of which comprises a battery 7, a lamp 21—26 and a contact plate 11—16. If the generatrix of the roller bearing ring race is rectilinear, all the contact plates come into contact with the race and all the signal lamps connected to the circuits of the respective contact plates are lighted. In this case the work piece can thus be accepted.

If, on the other hand, as shown in Fig 3, the generatrix of the race deviates from the rectilinearity, one or more circuits remain broken and the corresponding lamps remain dark. In Fig. 3 the contact plates 11, 12, and 16 are shown in conducting connection with the roller bearing ring, and consequently the corresponding lamps 21, 22, and 26 are burning. The contact plates 13, 14, and 15 on the contrary are out of contact with the roller bearing ring, and the corresponding lamps 23, 24, and 25 remain dark. The roller bearing ring shown in Fig. 3 is therefore to be rejected.

It is also of importance that the voltage of the circuit is relatively low to prevent detrimental sparking between the contact plates and the work piece.

In Fig. 4 the gauging unit and its electric contacts are shown more in detail than in Fig. 1. The contact plates 11—16 are fastened with close fit on a tube 30 of Bakelite or other insulating material, and the tube 30 in its turn is placed on a sleeve 31. At both sides of the contact plates 11—16 a couple of end plates 32, 33 are provided, and the contact plates are separated from these and from each other by insulating interlinings 34. The plates and the interlinings are supported as a unit by the sleeve 31 and are kept together between a protruding flange 35 on the sleeve 31 and a nut 36 firmly screwed onto the sleeve so that a mutual displacement cannot take place.

From one end of the checking unit six screws pass through holes in the plates and the interlinings. One of these screws, designated with 37 in Fig. 4, extends freely through the contact plates 11, 12, 13, 14, and 15. It is separated from these by a Bakelite tube 38 and threaded into the contact plate 16. Another screw located at the side of the screw 37 passes freely through the contact plates 11, 12, 13, 14, and 16 and is fixedly screwed into the contact plate 15. The lowermost screw 57 shown in Fig. 4 is screwed into plate 13, goes freely through plates 14, 15 and 16, and is separated by means of a Bakelite tube from the contact plates 11, 12. In the corresponding manner each of the six screws is threaded into and is in current conducting connection with one of the contact plates and goes freely through some of the plates and is by means of insulating material or air gap insulated from the other contact plates.

When the gauging unit is to be used, it is placed on a plug 40. The gauging unit is held to the plug 40 by means of a nut 41 and a washer 42. One end of the plug 40 is bored and receives the end of a multiple conductor cable 43 which is retained in it by means of a rubber bushing 44, a sleeve 45 and a nut 46. From the end of the cable ten conductors extend through holes 48 in the plug, and the ends of the conductors are retained by means of screws 49 on a ring 50 of canvas or other insulating and preferably somewhat elastic material. In order to obtain the desired angle of the gauging unit in relation to the plug 40 a pin 51 is provided on it, and the sleeve 31 of the gauging unit is provided with a hole for engagement with the pin 51. When the gauging unit is placed on the plug 40 and retained by the nut 41, the heads of the screws 29, 57 will abut against th heads of six of the screws 49. Hereby each contact plate 11—16 is put in conducting connection with a conductor in the cable 43 which is connected to the plug contact 4, schematically shown in Fig. 1. The plug 40 and the cable 43 can be used in connection with different gauging aggregates for checking different objects. In the embodiment exemplified in the drawings the gauging unit can have up to ten control segments.

The invention is not limited to the embodiment described above, but comprises all possible modifications of the same. In the drawings, the gauging arrangement is shown as used for checking cylindrical surfaces, but it is also useable for the examination of different surfaces of rotation with curved generatrix. The gauging arrangement according to the invention can also be used for checking plane surfaces or any curved or broken surfaces, in which case the gauging surfaces of the control segments together conform with the desired geometric form of the object to be examined.

Having thus described my invention, I claim and desire to secure by Letters Patent the following:

1. In a device for checking the profile of a work piece, the combination of a plurality of work-contacting members separated by insulating members, means for holding the work-contacting members and the insulating members firmly together to form a template, said members being bored through in several places, screws extending through the said bores, said screws being threaded respectively in the work-contacting members and electrically insulated from the other work-contacting members, parallel electrical connections through said screws to the contact members, electrical signalling devices arranged in said electrical connections, a source of power, a pole of which is connected to said electrical connections, a member of conducting material located outside the profile defined by the work-contacting members and connected to the opposite pole of said source of power, the source of power, the electrical connections, the signalling devices, the work-contacting members and the member of conducting material forming together a number of electrical circuits to be closed by the work piece through its contact with the work-contacting members along the profile to be checked and with the member of conducting material at a part of the work piece located outside the profile to be checked, the last-mentioned member forming a common part of the circuits.

2. Devices according to claim 1, wherein the heads of the screws are located on the one side of the template unit, a cable terminal provided with a number of conducting contact members, and means for holding the contact members against the screw heads to complete said parallel connections.

3. In a device for checking the profile of a work piece, a template consisting of a plurality of separate electrically conductive elements assembled in series arrangement so as jointly to define a profile corresponding to that desired in the work piece, said elements being narrow and set close together and being thereby adapted to contact the work piece in a plurality of closely adjoining points along the profile to be checked, a plurality of electrical circuits each containing one only of said elements together with an independent signal device to indicate flow of current in the circuit, a support member located entirely to one side of and apart from the said assembly of profile-defining elements and adapted to support the work piece in operative contact with the template, said support being of electrically conductive material and connected in series with the said elements and signal devices of the respective circuits and constituting a sole means common to all of said circuits for completing the circuits through the work piece.

CARL HJALMAR BJÖRKBOM.